May 9, 1967
A. T. HARRIS ETAL
3,318,791
PROCESS FOR REMOVING HARD CARBON DEPOSITS
FROM AN ACETYLENE-GENERATING ARC FURNACE
Filed Nov. 26, 1963
3 Sheets-Sheet 1
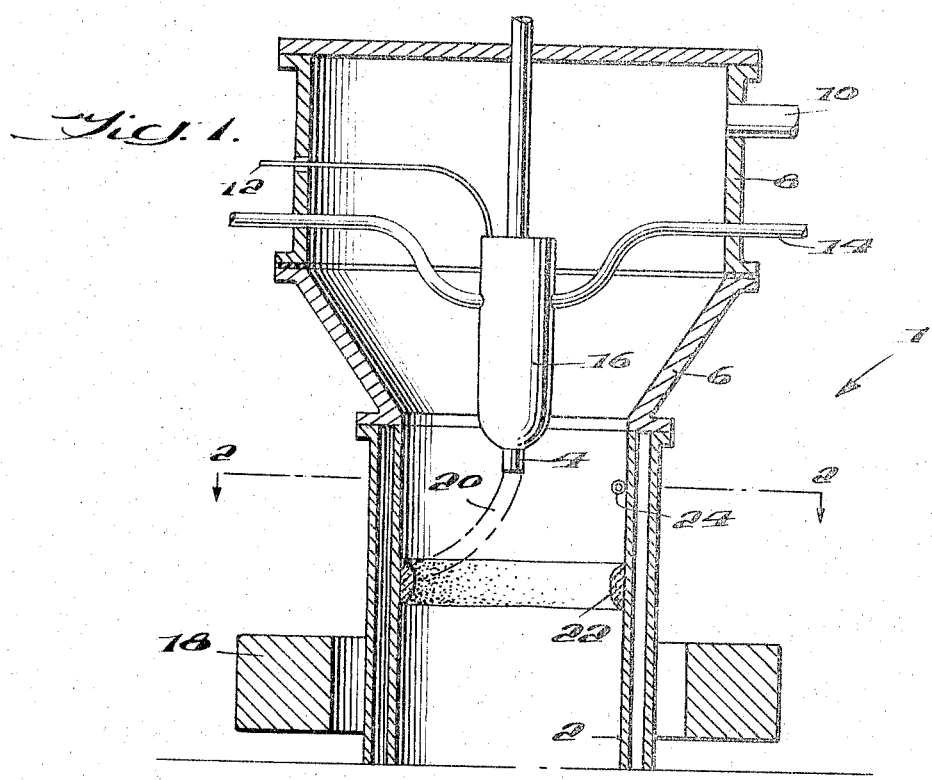
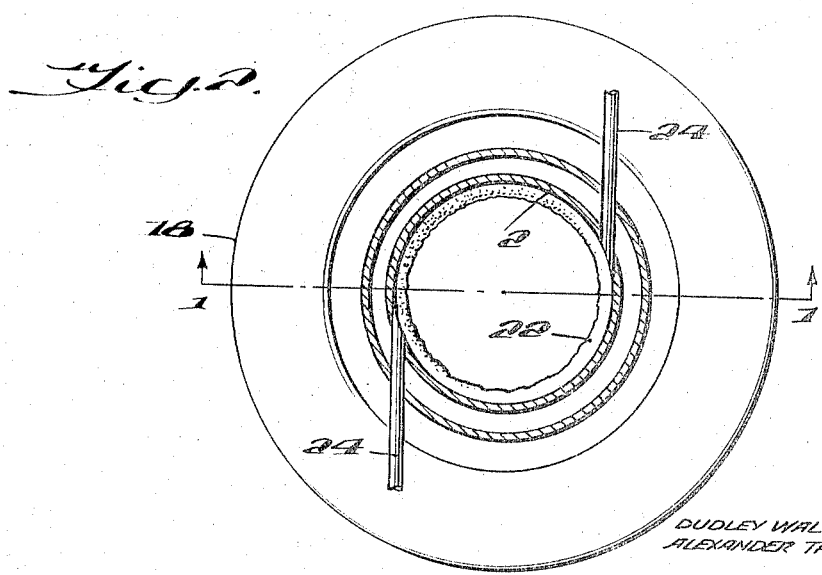
INVENTORS
DUDLEY WALTER CYRIL SPENCER,
ALEXANDER THOMAS HARRIS,
BY Edwin Tocker
AGENT May 9, 1967
A. T. HARRIS ETAL
3,318,791
PROCESS FOR REMOVING HARD CARBON DEPOSITS
FROM AN ACETYLENE-GENERATING ARC FURNACE
Filed Nov. 26, 1963
3 Sheets-Sheet 2
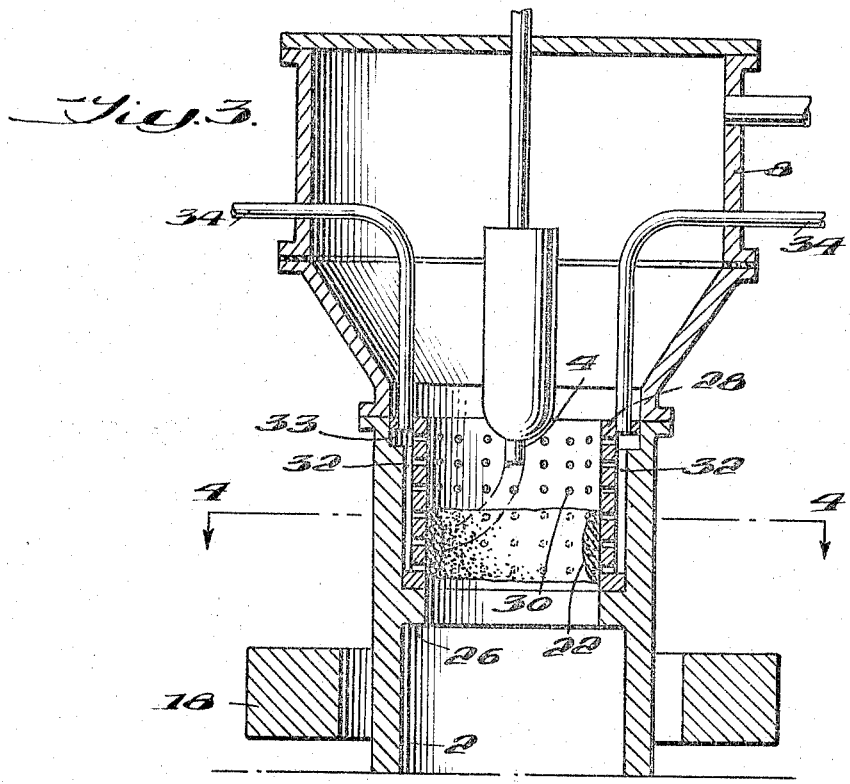
Fig. 3.
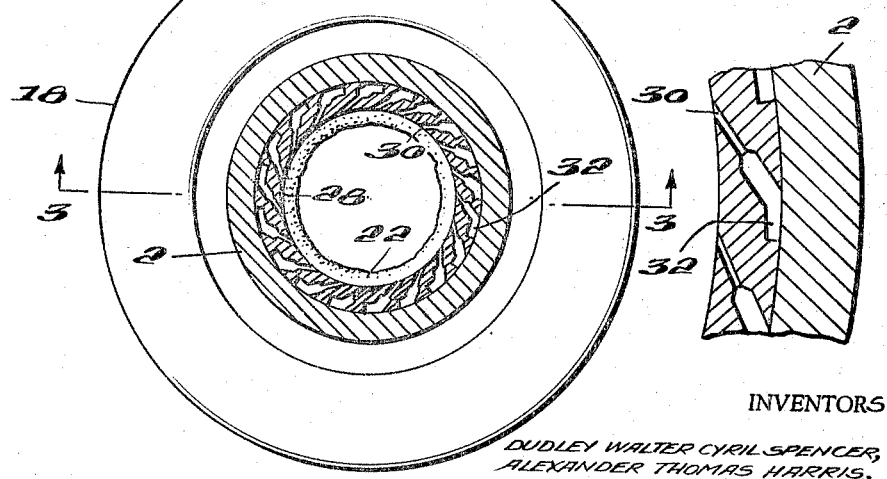
Fig. 4.
Fig. 5.
INVENTORS
DUDLEY WALTER CYRIL SPENCER,
ALEXANDER THOMAS HARRIS,
BY Edwin Tocher
AGENT INVENTORS
DUDLEY WALTER CYRIL SPENCER,
ALEXANDER THOMAS HARRIS,
BY Edwin Tocker
AGENT United States Patent Office
3,318,791
Patented May 9, 1967

3,318,791
PROCESS FOR REMOVING HARD CARBON DE-
POSITS FROM AN ACETYLENE-GENERATING
ARC FURNACE
Alexander Thomas Harris, Pleasure Ridge Park, Ky., and
Dudley Walter Cyril Spencer, Wilmington, Del., as-
signors to E. I. du Pont de Nemours and Company,
Wilmington, Del., a corporation of Delaware
Filed Nov. 26, 1963, Ser. No. 326,181
3 Claims. (Cl. 204—171)

This invention relates to the manufacture of acetylene by pyrolysis of hydrocarbons in an electric arc furnace in which undesirable deposits of carbon form and more particularly to an effective method of and apparatus for removing these deposits.

When acetylene is made by passing hydrocarbons through an electric arc which is struck between a central cathode and a surrounding anode in the form of a cooled metallic cylinder and the arc is rotated by means of an electromagnetic field, carbon deposits on both the cathode and the wall wall of the anode. Although carbon formation can be greatly reduced by proper selection of the operating conditions, it is still very undesirable to have it formed even gradually and in small amounts. Thus, its formation on the electrodes rapidly decreases the arc length, arc voltage, power input, and effective cross section and consequently decreases the productivity of the vapor phase reaction. Eventually, the carbon deposits build up so as finally to either short-circuit the arc or to close the furnace completely to the passage of gas.

The formation of carbon deposits on the cathode of the arc furnace described above can be successfully prevented by operating at certain current densities or, more precisely, at certain ratios of current to cathode diameter, as described in U.S. Patent 3,073,769. A method for preventing the carbon accumulation on the anode has long been sought. The carbon build-up in the arc region on the interior wall of the cylindrical anode is in the unusual form of a hard deposit which is quite adherent thereto. Loose, fluffy carbon deposits form on the anode downstream from the arc as in the usual arc vapor reaction process of the subject type. It is desirable to periodically remove both carbon formations before the accumulation of either type adversely affects furnace operation. Ordinary mechanical removal of these deposits or their removal by chemical means, as by burning in oxygen, is impractical since it involves suspending the acetylene production and then, after removing the carbon, taking further time to re-establish and adjacent the arc.

Removal of the loose fluffy carbon deposit has been accomplished during operation of the arc by brushing or occasionally by mere jarring of the anode. It has also recently been found that the hard carbon deposit can be removed while the arc is operating by periodically contacting this deposit with the sharp edge of a scraping tool. It has also been found that the scraping action of the scraping tool is made more effective by driving the tool in both a rotating and reciprocating motion through the hard carbon deposit. The scraping tool then has the preferred form of its edges being parallel to the axis of the cylindrical anode. When the current is reversed and the furnace wall, formerly the anode, becomes the cathode, the hard deposit formed thereon can still be removed by these scraping devices. While the operation of such a scraping tool is generally satisfactory towards removing the troublesome hard carbon deposit as well as the loose, fluffy carbon deposit to permit continuous operation of the arc, this technique has the disadvantage of the expense of the scraping tool and its driving equipment. A less costly way for removing carbon deposits is desirable.

It is therefore an object of the present invention to provide a process for removing hard carbon deposits from the electrode which defines the arc chamber of an arc furnace, especially of the type in which the arc is electromagnetically rotated, which process does not involve moving, mechanical parts within the furnace and does not involve discontinuity in the operation of the arc. A further object is to provide apparatus for carrying out this process. A still further object is to provide a new process and means for removing hard carbon deposits which form on the wall of an arc furnace employing an electromagnetically rotated arc for pyrolysis of hydrocarbons to form acetylene. And a further object is to effect removal of such carbon deposits by the action of water. Other objects will appear hereinafter.

It has been found that the most difficult-to-remove carbon deposits, the hard carbon formation which continuously forms on and tenaciously adheres to the surface of the electrode serving as the wall of the furnace along which the electromagnetically rotated arc scribes a path, can be effectively removed by the process of applying water to such carbon deposits. The amount of water so applied is that amount which will spontaneously dislodge the hard carbon deposit from the furnace wall.

This process and other objects of the present invention will be better understood by reference to the following description and accompanying drawings in which:

FIG. 1 is a schematic cross section (along line 1—1 of FIG. 2) of a side elevation of an arc furnace employing an electromagnetically rotated arc and incorporating means for applying water to the hard carbon deposit therein;

FIG. 2 is a section taken along line 2—2 of the furnace shown in FIG. 1;

FIG. 3 shows another embodiment (along line 3—3 of FIG. 4) of means for applying water to the hard carbon deposit in the furnace of the same general type as shown in FIG. 1;

FIG. 4 is a section taken along line 4—4 of the furnace shown in FIG. 3;

FIG. 5 is an enlarged fragmentary view of FIG. 4;

Figure 6:
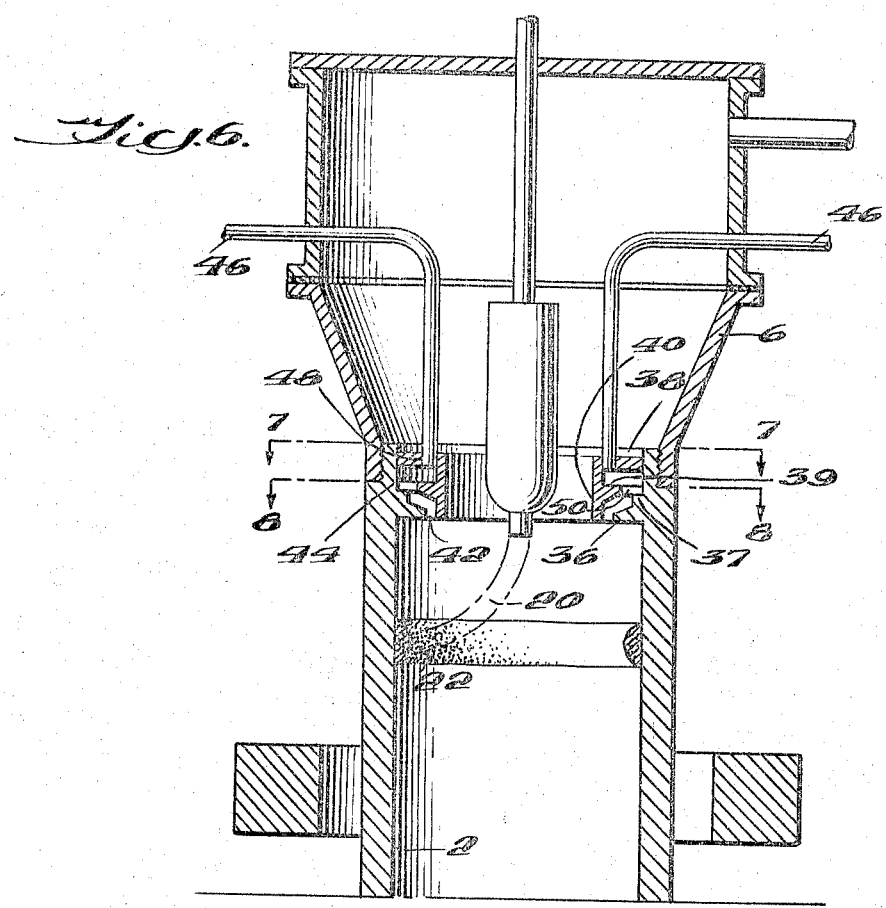
FIG. 6 depicts another embodiment (along line 6—6 of FIG. 7) for applying water to the hard carbon deposit in the furnace of the same general type as shown in FIG. 1.

In FIG. 1, is shown a representative arc furnace 1 consisting basically of a water-cooled cylindrical anode 2 with a rod-shaped carbon cathode 4 positioned along the longitudinal axis of the anode. Anode 2 is surmounted by a bell section 6, which is in turn surmounted by spool piece 8, electrically insulated from bell section 6 and which accommodates a port 10 for the introduction of the gaseous hydrocarbon reactants and hydrogen, feed connections 12 and 14 for electricity and cathode cooling water, respectively, and means 16 for positioning cathode 4. Details of the means 16, which can be used for holding, cooling, and advancing the cathode and maintaining its electrical connections and also details of the position of the electromagnet 18 are shown in U.S.P. 3,073,769 referred to above. Electromagnet 18 is positioned exteriorly of anode 2 and downstream from the tip of cathode 4.

In operation of furnace 1, the hydrocarbon gas or vapor and hydrogen is introduced therein and an arc 20 is struck between the cathode and anode. The magnetic field is developed within the anode by the electromagnet to cause the arc to rotate about the cathode and also to be deflected downward so that it scribes a path along the surface of the anode downstream from the cathode tip.

As the operation of furnace 1 proceeds, an annular deposit 22 of hard carbon form substantially in the path travelled by arc 20 over the surface of anode 2. At this point, water is applied according to the process of the present invention to effect removal of the hard carbon deposit 22.

In the embodiment of FIG. 1, a pair of nozzles 24 are set in opposing and substantially tangential fashion in the wall of anode 2 above the level of the carbon deposit 22. Water supplied to these nozzles from an external source is sprayed into the furnace where, with some help from the rotating arc and the downward passage of the gas, the water is distributed over and onto the carbon deposit. As a result of this application of water to the carbon, it spontaneously separates from the surface of anode 2 and falls to any desired collection point (not shown below).

FIG. 2 shows the annular shape of the hard carbon deposit 22 before contacting with water and the arrangement of nozzles 24 with respect to the deposit.

FIGS. 3, 4, and 5 show another embodiment for applying water to the hard carbon deposit. In this embodiment, the furnace is substantially the same as in FIG. 1, except for the omission of details which are irrelevant to this embodiment, and is numbered accordingly. The interior wall of anode 2 is provided with a projecting annular ring 26. An annular housing 28 is positioned within the anode, such as by an interference fit, in abutting relationship with the annular ring 26. The housing 28 is essentially a solid cylindrical member which forms a new anode surface in the arc region, upon which surface the hard carbon deposit forms. The housing 28 is machined out to contain numerous water supply passages opening to the interior of the furnace to contact the hard carbon formation from beneath its surface, rather than to apply water to the surface of the carbon formation as in the embodiment of FIG. 1.

For example, housing 28 can contain oblique passages 30, each making an angle of 61.5° with the radius of the housing and arranged in 6 vertically spaced levels of 16 passages in each level. For convenience in machining, the passages 30 are vertically aligned and vertical slots 32 are provided in the outer surface of housing 28 for each veritcal row of passages. These slots terminate at manifold 33 which is in turn supplied with water by a pair of water supply passages 34 leading from the upper portion of housing 28 to the exterior of spool piece 8.

FIG. 4 shows in cross-section an arrangement of passages 30 in a single level thereof in housing 28. FIG. 5 shows in enlargement a configuration for each passage 30 and vertical slot 32 at the rearward opening thereof.

Figures 7, 8:
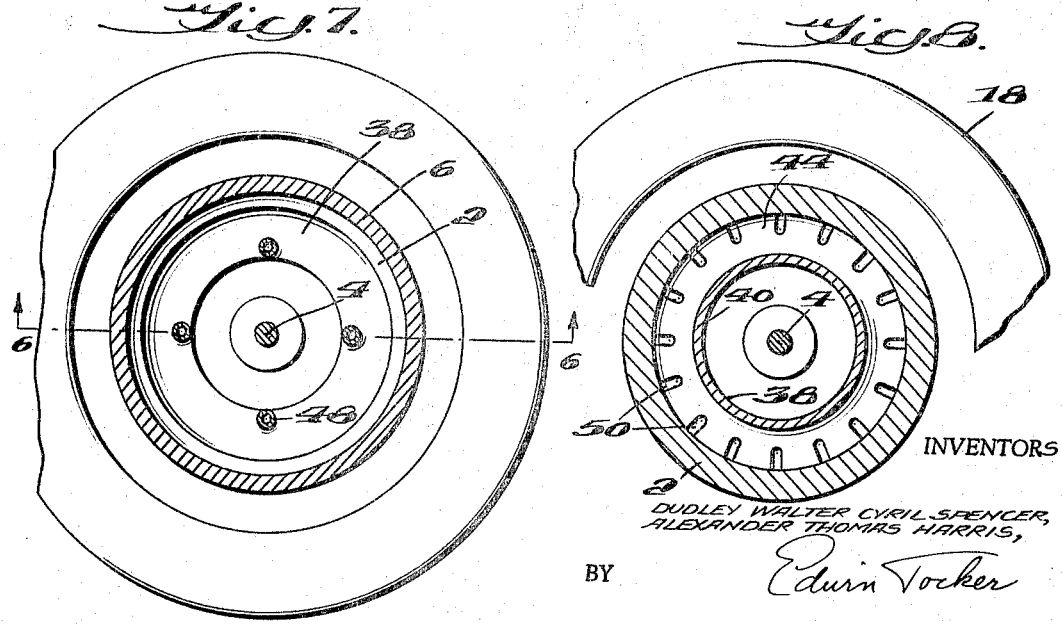
FIG. 7 is a section taken along line 7—7 of the furnace shown in FIG. 6.
FIG. 8 is a section taken along line 8—8 of the furnace shown in FIG. 6.

FIGS. 6, 7, and 8 show another embodiment for introducing water into the arc furnace to carry out the process of the present invention. In this embodiment, anode 2 and bell section 6 are threaded one to the other and the interior surface of the anode is provided with an inwardly projecting and tapering annular ring 36 having a step 37 above the region where the hard carbon deposit 22 occurs. An annular housing 38 is positioned within anode 2 such as by an interference fit therewith and abutting step 37. Housing 38 has a horizontal portion 39 and a vertical portion 40 which cooperate with the ring 36 to form a continuous annular nozzle to direct water emerging from the space 42 against anode 2 and at the carbon formation 22. Housing 38 is also provided with an internal annular groove 44 (the lower wall of which is the horizontal portion 39) which acts as a manifold for water received via supply lines 46 connected to four ports 48 (only two supply lines are shown) in the top of housing 38 and with distributing slots 50 communicating between groove 44 and space 42.

FIG. 7 shows in cross-section the arrangement of ports 48 in housing 38. FIG. 8 shows in cross-section (with only a portion of magnet 18 shown) the arrangement of slots 50 in housing 38.

The introduction of water via the embodiments of FIGS. 1–8 or equivalent structure can be intermittent or uniformly continuous or continuous with brief intervals of increased feed of the water. As illustrated in FIGS. 1–8, the water can be directed against the deposit on the anode from within the furnace space, or can flow down the anode wall from above, or may reach the anode surface through passages in the thickness of the anode itself. Since water present in the arc region of the furnace tends to react with the hydrocarbon feed to form carbon monoxide with a consequent decrease in the yield of acetylene, the amount of water introduced under any plan or structure should be kept at the minimum required to effect removal of the hard carbon deposit. The reduced yield of acetylene, however, is more than counterbalanced by the advantage of continuous operation of the furnace.

In the preferred process of the present invention, water is introduced intermittently into the arc furnace and the flow of gaseous hydrocarbon halted for as long as the water is so introduced. The feed of hydrogen gas is continued, however, and unexpectedly the arc is maintained thereby during the absence of the hydrocarbon feed. Hydrogen gas is usually added to the hydrocarbon feed to act as a carrier or diluent therefor; when hydrogen is not present for this purpose, it can be introduced into the arc furnace during interruption of the hydrocarbon feed for the purpose of maintaining the arc. By halting the hydrocarbon feed during water introduction, some loss in acetylene production time occurs, but this is more than outweighed by the savings in hydrocarbon feed not lost by the reaction with water.

Based on about each 11 inches of circumferential length of the zone of the furnace wall (anode 2) upon which the carbon is deposited, the following amounts of water can be advantageously employed: For wholly intermittent introduction of the water, an introduction period of from 0.5 to 6.0 gallons per minute for 5 to 120 seconds at intervals during continuous operation of the furnace of 5 to 25 minutes will be sufficient. Particularly when furnace operation is such that the amount of water needed is at the upper end of the volume range or is at the lower end of the frequency range, it becomes most desirable to halt the flow of gaseous hydrocarbon briefly for as long as the water is being introduced.

When necessary for supplemental cooling of the electrode, a small stream of water, at a rate not more than about 0.05 gal. per min. on the above basis, may be introduced continuously in addition to the larger, intermittent streams.

For removal of the adherent hard carbon deposits by the continuous introduction of water, at least about 0.1 gal. per min. of water is needed, although smaller amounts may be used for cooling only. All these water feed rates should be changed proportionately for larger or smaller anodes than the reference size circumferential length.

The upper limits for the rate of introduction of water simultaneously with the hydrocarbon feed depend on what is regarded as a justifiable decrease in yield of acetylene arising from the formation of carbon monoxide. Since what is justifiable will depend on the advantages, under specific circumstances, arising from the use of the present invention, it is obvious that no precise upper limits can be given. When penalty arising from large amounts of water becomes excessive and the water is added intermittently, the difficulty can be avoided by stopping the feed of hydrocarbon during the feed of water, as described above. It might be noted, however, that, when the flow is once raised so high that some liquid phase remains, further increase has little more effect on the formation of carbon monoxide and consequent reduction in acetylene yield.

The furnace wall from which the deposited hard carbon is removed by the process of the present invention may be acting as either the anode or cathode. For simplicity in this specification, however, it is usually assumed that the furnace wall is the anode.

The hydrocarbon feed may be any which is used in vapor form for making acetylene by pyrolysis, such as methane, propane, and higher petroleum fractions such as are contained in gasoline and fuel oils.

The anode 2 in FIGS. 1–8 and the housing 28 in FIGS. 3–5 are preferably of copper. When molybdenum or its alloys with small proportions of titanium and zirconium (which are preferred for anodes from which the carbon is to be removed by mechanical scraping) are used in the present invention, it is found that the carbon deposits are less readily removed by the action of water than from copper and that molybdenum and its alloys tend to crack and erode on contact with water.

In other forms of the apparatus used, the water may be directed against the part of the anode above the zone of contact with the arc as in FIGS. 6–8 through separate nozzles rather than through an annular slot. These nozzles may vary in number and may be directed either radially or with a tangential component and may be horizontal or inclined either up or down.

Scraping devices for removing carbon deposits can be used in connection with the present invention, particularly for removing the light, loosely adhering deposits of carbon which form on the anode surface well below the zone of contact with the anode by the arc. These deposits may be removed at least partly by water flowing down the anode wall from the upper part at which the hard deposit is removed. For complete removal of the light deposit, however, it is better to introduce additional streams or jets of water directly thereupon.

It is interesting that many liquids other than water, for example the fuel oil used as the source of acetylene, do not function like water to remove the carbon when directed against the anode.

The following examples are further illustrative of the present invention:

*Example 1*

Using the apparatus of FIGS. 6–8 in which anode 2 has an inside diameter of 3.5 inches and is made of copper, a vaporized petroleum hydrocarbon of approximate composition $C_{14.5}H_{30}$ is introduced continuously at a rate of 260 lbs./hr. through port 10 along with 51 lbs./hr. of hydrogen. The initial voltage is 620 and the pressure is 350 mm. The diameter of the graphite cathode 4 is 5/8 inch and the current is 1010 amperes, thus coming within the requirements of U.S. Patent 3,073,769. The apparatus is operated under these conditions for periods of 10 to 20 minutes without water, alternating with 30 second periods during which the feed of hydrocarbon is continued and water is introduced at a rate of 3 gallons per minute through water supply lines 46 and manifold 44 and out through the annular space 42 to the anode wall above the zone upon which the arc 20 strikes. During the longer periods, during which no water is supplied, a deposit of hard carbon builds up on the anode and the voltage drops because of the resulting shortened arc path from the anode to the surface of the growing carbon deposit. During these intervals, the voltage drops by about 5% corresponding to a formation of a carbon deposit about 1/8 inch thick. During the short 30 second periods of water introduction, the water dislodges the carbon deposit from the anode and the voltage returns to the original value. The operation of the furnace is normal, the yield of acetylene from the hydrocarbon being about 75% of theory and the exit gas containing about 17% by volume thereof on a dry basis, except during the brief periods of water-feed. During spraying, the proportion of acetylene in the exit gas drops to 6.2% by volume corresponding to a yield of about 30% of theory. However, based on the entire cycle of 10 minutes without water and 30 seconds with water, the overall decrease in yield is only about 3.0% of theory.

*Example 2*

The apparatus and procedure are as in Example 1 except that the feed of oil is cut off while the water is being introduced. Accordingly, there is practically no formation of carbon monoxide due to reaction between water and hydrocarbon and the yield is 75% throughout. The carbon is effectively removed as in Example 1 and the yield of acetylene and the concentration of acetylene in the off gas are essentially the same as when no water is used.

*Example 3*

Using the apparatus of FIGS. 3–5, with a copper anode 2 of inside diameter 2.9 inches, the vaporized hydrocarbon and hydrogen are introduced as in Example 1 and at the same rates. Water is introduced continuously through the supply lines 34, manifold 33, and passages 32 and finally through the fine passages 30 to the surface of anode 2, at the rate of 0.1 gallon per minute. The voltage is 500 and the pressure, current, and cathode size are the same as in Example 1. Under these conditions, the formation of carbon on the anode is prevented, the voltage remaining practically constant. The yield of acetylene is 65% and its concentration in the exit gas is 13%, instead of 17% without the introduction of water. The concentration of carbon monoxide is 7%, due to the reaction of the water with the hydrocarbon feed.

*Example 4*

The apparatus and procedure are as in Example 3 except that water is fed continuously at a rate of only 0.05 gallon per minute (in order to cool the anode enough to avoid local fusion with closing of the fine passages) and the flow of water is increased to 2.5 gallons per minute for one minute at 25-minute intervals. The voltage falls during these intervals of low water feed, from about 500 to about 470 volts, indicating some carbon accumulation, but returns to normal after the periods of increased feed. Thus there is no continuous accumulation of carbon and the voltages are kept between narrow limits.

As many widely different embodiments of this invention may be made without departing from the spirit and scope thereof, it is to be understood that this invention is not limited to the specific embodiments thereof except as defined in the appended claims.

What is claimed is:

1. A process for removing the hard carbon deposit which forms, during the pyrolysis of hydrocarbons to form acetylene, on the electrode serving as the wall of the arc furnace and in the region in which the arc of said arc furnace strikes said electrode, said process comprising interrupting the feed of said hydrocarbons to said arc furnace while maintaining said arc and applying, during the interruption of said feed, sufficient water to said carbon deposit to dislodge it from said electrode.

2. The process as recited in claim 1, wherein for each 11 inches of anode circumference from 0.5 to 6.0 gallons per minute of water is applied for a period of from 5 to 120 seconds at from 5 to 25 minute intervals of operation of said furnace.

3. A process for removing the hard carbon deposit which forms, during the pyrolysis of hydrocarbons to form acetylene, on the electrode serving as the wall of the arc furnace and in the region in which the arc of said arc furnace strikes said electrode, said process comprising interrupting the feed of said hydrocarbons to said arc furnace and during the interruption of said feed, maintaining said arc in the presence of hydrogen and applying sufficient water to said carbon deposit to dislodge it from said electrode.

References Cited by the Examiner
UNITED STATES PATENTS

| | | | |
|---|---|---|---|
| 2,165,820 | 7/1939 | Smyers | 204—171 |
| 2,660,556 | 11/1953 | Butler | 204—171 |
| 3,119,758 | 1/1964 | Orbach | 204—171 |

JOHN H. MACK, *Primary Examiner.*

R. K. MIHALEK, *Assistant Examiner.*